(12) United States Patent
King

(10) Patent No.: US 8,242,631 B2
(45) Date of Patent: Aug. 14, 2012

(54) PROGRAMMABLE ELECTRONIC TIMER

(76) Inventor: Joseph W. King, North East, MD (US)

( * ) Notice: Subject to any disclaimer, the term of this patent is extended or adjusted under 35 U.S.C. 154(b) by 293 days.

(21) Appl. No.: 12/706,587

(22) Filed: Feb. 16, 2010

(65) Prior Publication Data

US 2011/0198943 A1    Aug. 18, 2011

(51) Int. Cl.
*H02J 9/00* (2006.01)
(52) U.S. Cl. .............. 307/64; 307/65; 307/66; 307/116; 368/10; 368/108
(58) Field of Classification Search .............. 307/64–66, 307/140–141, 116; 368/3, 10, 108
See application file for complete search history.

(56) References Cited

U.S. PATENT DOCUMENTS

| | | | | |
|---|---|---|---|---|
| 5,881,022 A | * | 3/1999 | Morganstein | 368/46 |
| 6,167,000 A | * | 12/2000 | Chow | 368/107 |
| 6,307,812 B1 | * | 10/2001 | Gzybowski et al. | 368/10 |
| 6,483,780 B2 | * | 11/2002 | Gzybowski et al. | 368/10 |
| 6,798,631 B1 | * | 9/2004 | Farsetta | 361/115 |
| 2004/0178683 A1 | * | 9/2004 | Hermetz et al. | 307/141 |
| 2004/0264300 A1 | * | 12/2004 | Gratkowski | 368/3 |
| 2005/0094786 A1 | * | 5/2005 | Ossa | 379/111 |
| 2007/0097793 A1 | * | 5/2007 | Nguy et al. | 368/15 |

* cited by examiner

*Primary Examiner* — Jared Fureman
*Assistant Examiner* — Alfonso Perez Borroto

(57) ABSTRACT

A device and method to control a programmable portable electronic timer to selectively provide AC power to an external electrical device by selecting a plurality of varying start times and stop times for each of at least two days, where each start time and stop time may be unique, and whereby the start/stop times define a period of timer operation to provide AC power to an external electrical device. An uninterrupted "count down" of timer information stored within the timer while AC power is unavailable to the timer is also provided, such that when AC power is restored to the timer, the providing of AC power to the external electrical device is not skewed by any period of time that the AC power is unavailable to the timer.

18 Claims, 7 Drawing Sheets

| SET TIME | HOUR | MINUTES | AM/PM | — 12

FIG. 4A

| SET DATE | MONTH | DAY | YEAR | — 12

FIG. 4B

PROGRAMMABLE ELECTRONIC TIMER

BACKGROUND OF THE INVENTION

1. Field of the Invention

The invention relates generally to a device and method for programmably and automatically setting varying start and stop times of operation for a portable electronic timer device for providing, and cutting off, electrical power from a local AC power grid with respect to one or more external electrical devices connected to the electronic timer.

2. Description of the Related Art

As understood in the art, portable electronic timers may be used within homes or businesses to provide power to other electrical devices plugged into such a timer at certain selected times. Typically, such timers are electro-mechanical in design and are plugged into a power outlet within a home or business to turn on and off lights, or other electrical devices which are connected to the timer, for various reasons. For example, for a home or small business, a lighting device, such as a lamp, may be connected to such a timer so that the lamp is turned on or off at the same pre-selected time(s) each day for the convenience of the home or business owner. The owner may desire to save on utility bills by restricting use of the lighting device, or desire to avoid having to physically walk around the home or business to manually turn on and off lights, or to attempt to fool a potential burglar that the owner of the home or business is home at night by automatically turning on and off lights without being physically present.

As described above, such timers are typically electro-mechanical in design and have limited programmable functionality. Such timers typically include an exterior rotary dial which is rotated by a user in one direction to set the timer to the current time. Additionally, the rotary dial typically has imprinted thereon 24 equally spaced, intervals to indicate each of the 24 hours in a day. At the periphery of the rotary dial, for each of the 24 equally spaced intervals, there typically a plurality of physical holes to approximate 10 or 15 minute graduations for each of the 24 hours, depending on the number of holes for each hour increment on the rotary dial.

For such a rotary timer, one or more sets of mechanical pins can be inserted into any of the various physical holes to correspond to a start time (start time pin) and a stop time (stop time pin) for each set of pins, whereby the electro-mechanical timer will provide power from the home or business power grid to one or more electrical devices which are plugged into, or otherwise electrically connected to, an output of the electro-mechanical timer. The insertion of the set of mechanical pins into the rotary dial performs a function of "programming" the timer for a desired approximate start and stop time for correspondingly turning on and turning off a light or other electrical device. These "programmed" times, however, are fixed and are not variable from day to day. A spring-tensioned electrical switch disposed within the rotary dial contacts an end of the start pin (which provides electrical power to the output) at a first time and then, at a later time, contacts an end of the stop pin which has been inserted into a hole on the periphery of the rotary dial. After the desired stop and start times are set by a user via the insertion of the start and stop pins, the rotary dial is rotated by the user to set the current time, by aligning an arrow or other external indicator with a time value indicated on the rotary dial, and the timer is plugged into a wall outlet to provide electrical power to the timer. The rotary timer is then running and set.

Once electrical power is provided to the timer, the timer will then continuously rotate, very slowly, in either a clockwise or a counter-clockwise direction, depending on the design. When the end of the start pin, which has been previously inserted into the rotary dial by a user to program the timer for a start time, contacts the spring-tensioned electrical switch disposed within the rotary timer, power is provided from the power grid of the home or business to the electrical device which is plugged into the timer. Conversely, when the end of the stop pin, which has been previously inserted into the rotary dial by a user to program the timer for a stop time, contacts the spring-tensioned electrical switch disposed within the rotary timer, power is cut of from the power grid of the home or business to the electrical device which is plugged into the timer. Some such timers allow the use of two or more sets of start and stop pins to program the timer, but once set (unless there is a power failure) the timer will start and stop at the same time each day.

An obvious disadvantage of these types of rotary electro-mechanical timers is that all pre-selected start and stop times are, once set by a user via the insertion of the mechanical start and stop pins in the rotary dial, incapable of being changed (varied) unless the pins are physically pulled out by the user and reinserted into different holes to indicate a different mechanical programming of the timer. Thus, for example, a timer which has an inserted start pin which causes the timer to initiate the provision of electrical power to a lamp connected to the timer at 7:02 pm, and has an inserted stop pin which causes the timer to cut off the electrical power to the lamp at 10:32 pm, will (without an interruption of power to the timer itself) continuously perform the tuning on and the turning off of the lamp, on a daily basis, at the same times.

Any potential burglar on the outside of the home or business can easily monitor, on a daily basis, the on and off times of internal lighting for the home or business. Since the on and off times for the lamp will not vary day to day for the rotary electro-mechanical timer, the potential burglar may deduce that the occupant of the home or business is not home. Of course, the potential burglar may also look for other signs of occupancy, such as cars in the driveway, other lights in the home being used, or other obvious signs of human activity, before deducing that the home or business is ripe for a break-in.

However, many people who take a vacation, go on a business trip, or participate in any other activity which causes their home or business to be unoccupied for a period of days or weeks, typically use such an electro-mechanical rotary timer to attempt to fool any potential burglar, or nosey neighbor, that they are home and are not away, via the automatic turning on and off of a lamp in the home or business. Thus, they would be susceptible to a "casing" of their house by a potential burglar who will surely notice that a light is being turned on and off at the same time each day, and that no other signs of human activity appear at the house.

Another disadvantage of these types of rotary electro-mechanical timers is that pre-selected start and stop times are not capable of being precisely chosen. The start and stop times are not exactly predeterminable, since the pre-manufactured holes physically arranged at the periphery of the rotary dial, into which the start and stop pins are inserted, may not align with any precise graduation of time designated on the rotary dial. For example, a hole may not aligns precisely with the designation of 1 PM or 1:15 PM, etc. and activation of the switch may actually occur 3-5 minutes (or more) away from the actual desire time of start or stop. Thus, for example, a start pin inserted into a hole near the designation "1 PM" may actually trigger the switch at 1:05 pm (or 12:55 PM) and not at precisely 1 PM. The same reasoning applies to any stop time for any stop pin.

An additional disadvantage is that such an electro-mechanical timer device cannot operate when there is a loss of electrical power being supplied to the device, which may occur during an electrical thunderstorm, nearby utility work, etc., while the home or business owner is away. Thus, if power is lost at any time while the owner is away the electro-mechanical timer cannot operate and the light will not turn on and off as desired. Furthermore, even if power is restored to the timer after several minutes (or worse, several hours or days) the timer will resume operation at the point of time that power is restored, but the times for turn-on and turn-off of the light previously set by the owner are now skewed by the time period of the power outage. Thus, for power outages of several hours or more, the timer will cause the light to turn on and off at times vastly different than those preselected by the owner and perhaps may occur during daylight hours instead of during the night, thereby allowing an potential burglar to easily discern that no lights are visible at night in the home or business.

Therefore, a need exists for an electronic timer which is easily programmable by a home occupier or business owner, which can be plugged into an electrical outlet of the home or business, and which can vary the start and stop times on a day to day basis for, respectfully, providing and cutting off electrical power from the power grid of the home or business via the timer in regard to a lamp or any other electrical device plugged into the timer.

Additionally, there is a need for an electronic timer that will not skew pre-selected "turn on" and "turn off" times by the amount of time during which AC power to the electronic timer is unavailable or insufficient.

SUMMARY OF THE INVENTION

Disclosed is a device and method to control a programmable portable electronic timer to provide power from a local power grid to an external electrical device which includes a housing, including a plurality of function buttons, a display to visually display timer information, a first electrical power connector to receive AC power from the local power grid, and a second electrical power connector configured to provide AC power to an external electrical device; wherein the housing further includes internal electronic circuitry, including an AC/DC converter electrically connected to the first electrical power connector and having DC power output connected to the display, a memory electrically connected to the AC/DC converter DC power output, and a controller electrically connected to the memory and to the AC/DC converter DC power output; and wherein the second electrical power connector is automatically provided AC power from the local power grid during a selected time period in response to tinier control information previously selected by a user and stored in the memory, such that start and stop times for the selected time period varies over sequential days of operation of the timer.

A method is disclosed herein to control a programmable portable electronic timer to selectively provide AC power to an external electrical device, including selecting a plurality of varying start times and stop times for operation of the electronic timer for each of at least two days of timer operation, where each start time has an associated unique stop time which defines a period of timer operation, providing AC power to an electrical connector disposed on the timer only during each defined period of timer operation, where the electrical connector is capable of being connected to an external electrical device, and providing an uninterrupted "count down" of timer information stored within the timer while AC power is unavailable to the timer, such that when AC power is restored to the timer, timer operation of providing AC power to the electrical connector continues at the selected start times and stop times without being skewed by any period of time that the AC power is unavailable to the timer.

The above, as well as additional objectives, features, and advantages of the present invention will become apparent in the following detailed written description.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 4A-7B are exemplary illustrations of information visually displayed on the display of the timer device, according to an embodiment of the present general inventive concept.

In the following detailed description of exemplary embodiments of the general inventive concept, reference is made to the accompanying drawings which form a part hereof, and in which is shown by way of illustration specific exemplary embodiments in which the general inventive concept may be practiced.

DETAILED DESCRIPTION OF PREFERRED EMBODIMENTS

In the following detailed description of exemplary embodiments of the general inventive concept, specific exemplary embodiments in which the general inventive concept may be practiced are described in sufficient detail to enable those skilled in the art to practice any invention claimed herein. It is to be understood that other embodiments may be utilized and that logical, architectural, programmatic, mechanical, electrical and other changes may be made without departing from the spirit or scope of the general inventive concept. The following detailed description of the general inventive concept is not to be taken in a limiting sense, and the scope of any invention claimed herein is defined only by the appended claims.

Figure 1:
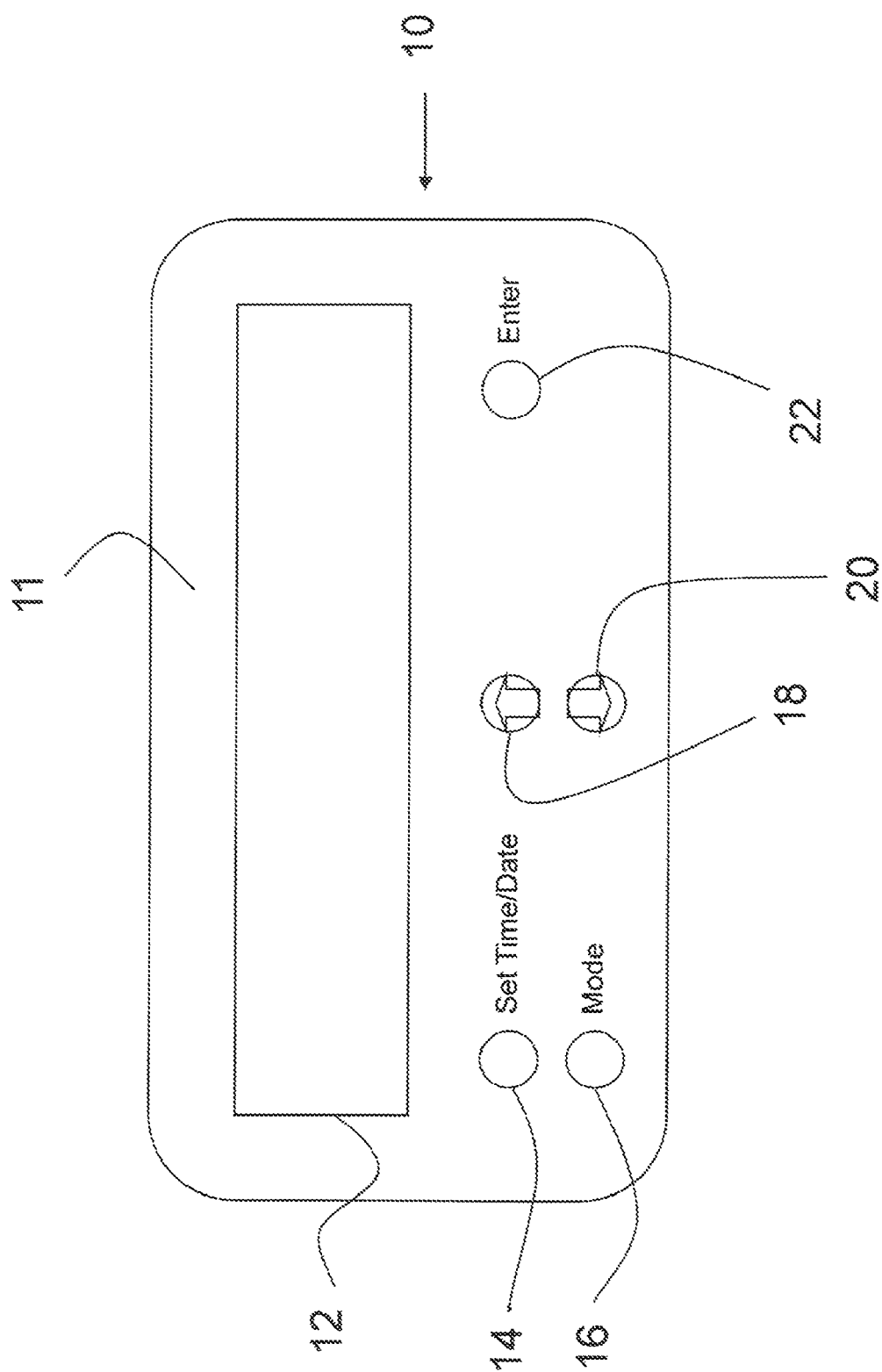
FIG. 1 is an illustration of the front view of the timer device, according to an embodiment of the present general inventive concept.

FIG. 1 depicts an illustration of the front view of the timer device 10, according to an embodiment of the present general inventive concept. The timer device 10 includes a digital visual display 12 and various user functions buttons. In this embodiment, a Set Time/Date button 14, a Mode select button 16, "Up Arrow" button 18, "Down Arrow" button 20 and Enter button 22 are disposed on a front surface 11 of the timer device 10. In other embodiments, fewer or additional user function buttons may be used and/or may be disposed on any other surface of the timer device 10. The display 12 visually displays various information, as described below in regard to FIGS. 4A-7B.

Figure 2:
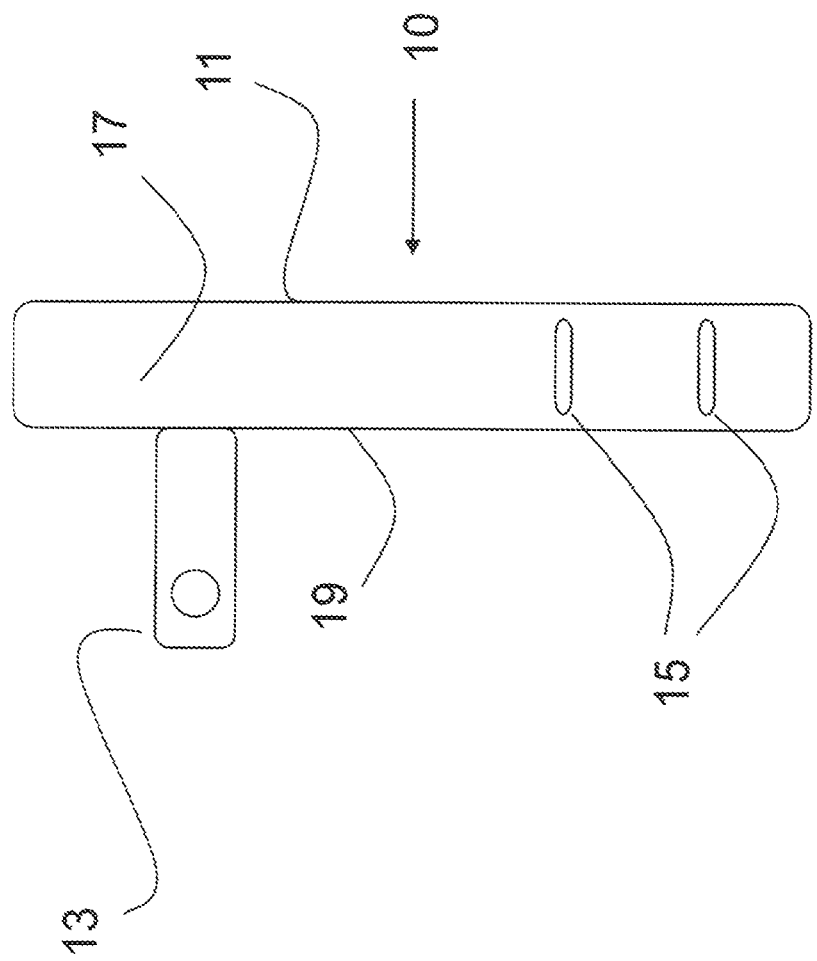
FIG. 2 is an illustration of a side view of the timer device, according to an embodiment of the present general inventive concept.

FIG. 2 depicts an illustration of a side view of the timer device 10, according to an embodiment of the present general inventive concept. As illustrated, along a first side surface 17 of timer device 10 are disposed a set of electrical apertures 15 to receive an electrical plug (not shown) of an external electrical device (which may be lighting element 31 of FIG. 3, described below). The electrical apertures 15 provide AC power to the external device, which is plugged into the electrical apertures 15, during a selected time period, as described in further detail below. The AC power available at apertures 15 is received by the timer device 10 via electrical contacts 13 which are disposed on the rear surface 19 of the timer device 10. The electrical contacts 13 are adapted to be plugged into an electrical outlet (not shown) of a home or business which outlet provides AC power (220V AC or 110V AC) from a local power grid to which the electrical outlet in electrically connected. In another embodiment, the apertures 15 may be disposed along any other side surface, or the front surface 11, of the timer device 10.

Figure 3:
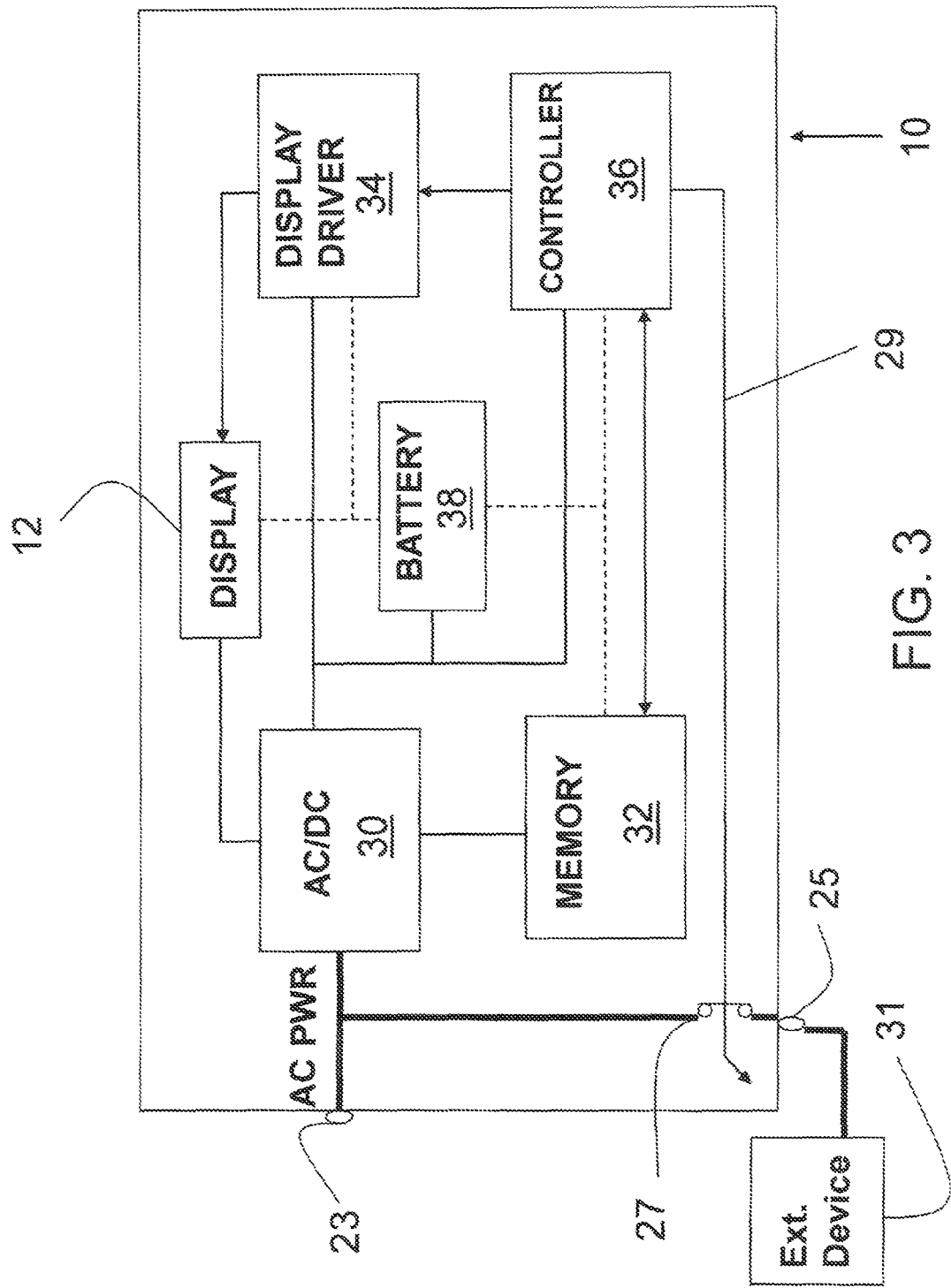
FIG. 3 is a functional block diagram illustrating exemplary functionality of the timer device, according to an embodiment of the present general inventive concept.

FIG. 3 depicts a functional block diagram illustrating exemplary functionality and connectivity of the timer device 10, and an external electrical device 31 connected thereto, according to an embodiment of the present general inventive concept. The functionality of timer device 10 may be achieved via a combination of electronic hardware components and/or electrical circuitry and software. In the illustrated embodiment of FIG. 3, the timer device 10 includes AC/DC conversion circuitry 30 to convert alternating current (AC) received by the timer device 10 from the local power grid via electrical power connector 23 (which may be electrical contacts 13 of FIG. 2) to direct current (DC) to power the circuitry and electrical components of the timer device 10, as described below.

After AC power is received and converted by AC/DC conversion circuitry 30 into DC power. DC power output from the AC/DC conversion circuitry 30 is provided to the display 12, a memory 32, a display driver 34 and a controller 36 (which may be a microprocessor, and/or control logic implemented in hardware and/or software). Memory 32 may be a static memory, such as flash memory or a disk drive, or may be a dynamic memory such as a dynamic random access memory (DRAM). Data and control signals pass between the memory 32 and the controller 36 to control operation of the timer device 10, including operation of the visual display of information on display 12 and receipt of input signals from the user function buttons (12, 14, 16, 18, 20 and 22) discussed above in regard to FIG. 1. The display driver 34 receives command signals and data from the controller 36 and in response thereto provides corresponding control and data signals to the display 12 to visually display various information on the display 12.

A battery 38 is a replaceable rechargeable battery used for backup power and is connected to the DC power output from the AC/DC Converter 30. In another embodiment the battery 38 is not rechargeable, but is replaceable. When circuitry (not shown) connected to the battery 38 detects, using known methods, that there is insufficient DC power being supplied by the AC/DC Converter 30 (battery backup situation), the battery 38 supplies DC power to the various functional blocks (via the hashed lines, as illustrated). In battery backup situation, the functional blocks 12, 32, 34 and 36 will operate from battery 38 supplied DC power, which allows the continued and uninterrupted "count down" of all selected Start/Stop times (described below). However, since the AC power from the local power grid may be unavailable, the switch 27 will not be operable until AC power is restored. But, when AC power is restored, the timer device 10 will not be skewed by any amount of time of the AC power loss, but will immediately begin full operation, including immediately providing AC power to external electrical device 31 if the timer is within a PD 1 or PD 2 period of operation.

In the embodiment of FIG. 3, the dark bold lines indicate AC power paths, the thin lines without an arrow head indicate DC power paths for DC power supplied by AC/DC Converter 30, the hashed lines indicate DC power paths for DC power supplied by Battery 38 (in battery backup situation), and the thin lines with an arrow head indicate data/control signal lines. In other embodiments, other power, control and data paths may be extant.

In response to Start/Stop timer information input by a user on timer device 10 and stored in memory 32 (described below in further detail), the controller 36, via a control signal 29, controls a switch 27 to open to prevent AC power from flowing from electrical power connector 23 to AC power output connector 25 (which may be the electrical apertures 15 of FIG. 2) and to close switch 27 to provide AC power from electrical power connector 23 to AC power output connector 25. External electrical device 31 (which may be a lamp) is connected to AC power output connector 25 to receive AC power from timer device 10 during at least one selected time period, as described below.

An embodiment of the operation of timer device 10 is now described. While the timer device 10 is being powered by battery 38 in battery backup situation, or by electrical power received via electrical contacts 13 being inserted into an AC electrical outlet in a home or business, a user depresses the Set Time/Date function button 14 for at least 3 seconds, which causes all prior stored Start/Stop times and Time/Date times of timer device 10 (if any) to be cleared. As illustrated in FIG. 4A, the display 12 will then visually display Set Time, Hour, Minutes and AM/PM fields, as illustrated. In other embodiments, the location of any of these fields may differ from that illustrated in FIG. 4A. A cursor will appear on the Hour field within the display 12. The user increments or decrements the Hour field, using the Up Arrow button 18 and/or the Down Arrow button 20 (FIG. 1) until the value for the hour in the Hour field matches the hour of the actual time of day. When the desired number for the Hour field has been achieved, the user presses the Enter button 22 (FIG. 1) to set the Hour data in memory 32 (FIG. 3).

The cursor then automatically advances to the Minutes field, and in a similar manner the user selects the actual time of day value for Minutes. Once set by the user in memory 32, the cursor then moves automatically to the AM/PM field which is toggled (if necessary) by use of the Mode button 16 (or by use of another button in other embodiments) until the desired AM or PM data, corresponding to the actual time of day, is set by the user using the Enter button 22 which enters the AM/PM data in memory 32.

As shown in FIG. 4B, the Set Date field then appears visually displayed on display 12, with Month, Day and Year fields, In a manner similar to that described above for the Set Time operation of FIG. 4A, the user sets the Month, Day and Year fields with data corresponding to the actual date. Likewise, all the Set Date information is provided to the memory 32 (FIG. 3). Once the timer device 10 is programmed with the current time and date information, the user then may select a mode of operation for the timer device 10.

Three (3) modes of operation of timer device 10 are described herein, although in other embodiments additional or fewer modes may be used. If a user desires to select and program by entering specific start and stop times for operation of timer device 10, the user may depress the Mode button 16 (FIG. 1) once to select a Daily Mode of operation. If the user desires to let the timer device 10 automatically choose each start and stop time, the user may instead depress the Mode button 16 twice to select a Random Range (RR) Mode of operation. The RR Mode will be discussed below in greater detail. A Random Daily Mode (RDM) of operation may also be selected, and will be discussed below.

When the Daily Mode of operation is selected by the user, the current day is displayed on display 12 next to an indication of "PD 1" which indicates "Period 1". The cursor will remain on the displayed day field (illustrated in FIG. 5A as "SAT", indicating that Saturday is the current day) until the Enter button 22 is depressed by the user. The start and stop times for timer device 10 can be set and programmed beginning on the current day displayed by the timer device 10, or can be set and preprogrammed to begin on a day which is up to six (6) days in advance from the current day. In other embodiments, a maximum of more or less days in advance of the current day may be used. If Saturday, the current day, is to be the first day of operation of the timer device 10, then the Enter button 22 is depressed by the user. If a later day (i.e., Sunday-Friday) is to be the first day of operation of the timer device 10, then the Up Arrow button 18 or the Down Arrow button 20 is depressed until the desired first day of operation is displayed in the Day field on display 12 next to "PD 1", whereby the user then depresses the Enter button 22 to set the data and program the timer device 10 to start operation on day selected and displayed on display 12.

Figure 5A:
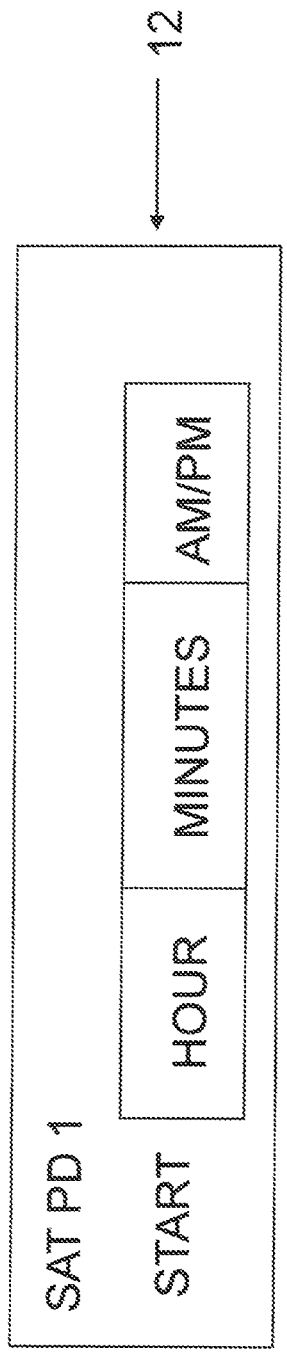
Figure 5B:
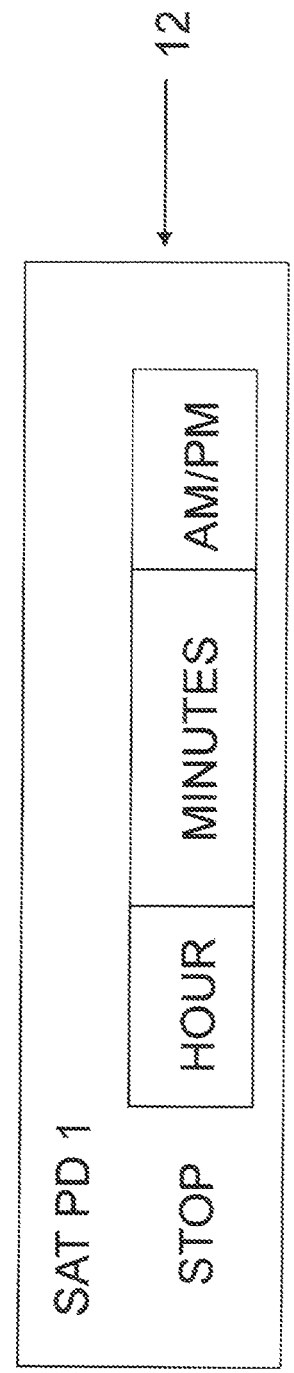

After the desired day to begin operation of the timer device 10 is selected (that is, the day to begin controlling the AC power from electrical power connector 23 to AC power output connector 25 to provide to the external electrical device 31), a "Start" field is displayed on display 12, as are Hour, Minutes and AM/PM fields. In a manner similar to that described above in reference to FIGS. 4A and 4B in regard to programming the timer device 10 for the current Date/Time, the user selects the desired Start time for the timer device 10. The data for these fields, as selected by the user, is provided to memory 32 (FIG. 3). Once the AM/PM field has been set by the user via use of the Enter button 22, the "Stop" field (as illustrated in FIG. 5B) is then displayed on display 12, as are as are Hour, Minutes and AM/PM fields. The user then selects a desired Stop time in a similar manner as that described above for the Start time procedure. The Start and Stop times preferably occur during the same day and do not extend into the next day (i.e., cannot extend beyond midnight of a single day).

Figure 6A:
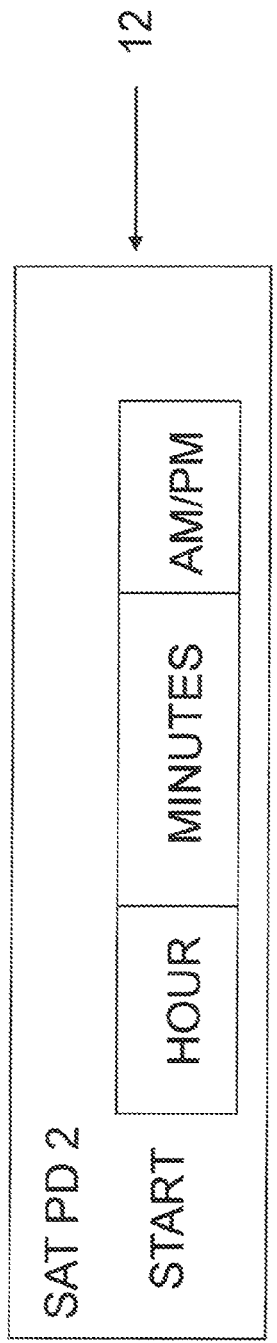

Once the user sets the Start and Stop times for period 1 (PD 1) of the first day of operation, the display 12 then displays a screen having an optional second period (PD 2) of Start/Stop programming, as depicted in FIG. 6A. That is, a second Start/Stop period can be set and programmed by the user for the same day as the first Start/Stop period selected by the user. In other embodiments additional or fewer Start/Stop periods may be used.

If the user does not desire a second Start/Stop period for the same day, after the cursor moves to the Hour field for PD 2, which will be initially blank, the user simply depresses the Enter button 22 for the blank Hour field to set the timer device 10 such that no PD 2 will be set and selected so that only a PD 1 set of Start/Stop times of operation will occur for that selected day. The display 12 then automatically displays a next sequential day for the user to program new PD 1 Start/Stop times in a similar manner. In this example, if the first programmed start day of operation is a Saturday, the display 12 will display "SUN" (Sunday) PD 1, which is the next sequential day from the SAT day of operation already set.

If a second Start/Stop period (PD 2) for the selected day of operation is desired, Start/Stop times are user selected and set in a manner similar to that described above for the PD 1 Start/Stop times. The display 12 will then automatically display the next sequential day (i.e., "MON") for a PD 1 selection of Start/Stop times and programming resumes.

Additional desired sequential days are then similarly user programmed in Daily Mode for PD 1 Start/Stop times, and optionally for PD 2 Start/Stop times for the same respective day. Timer device 10 operation of up to 30 days in advance may be selected and set with PD 1 (and optionally, PD 2) start times by the user. In other embodiments, a greater or lesser number of sequential days for programming may be available.

Figure 6B:
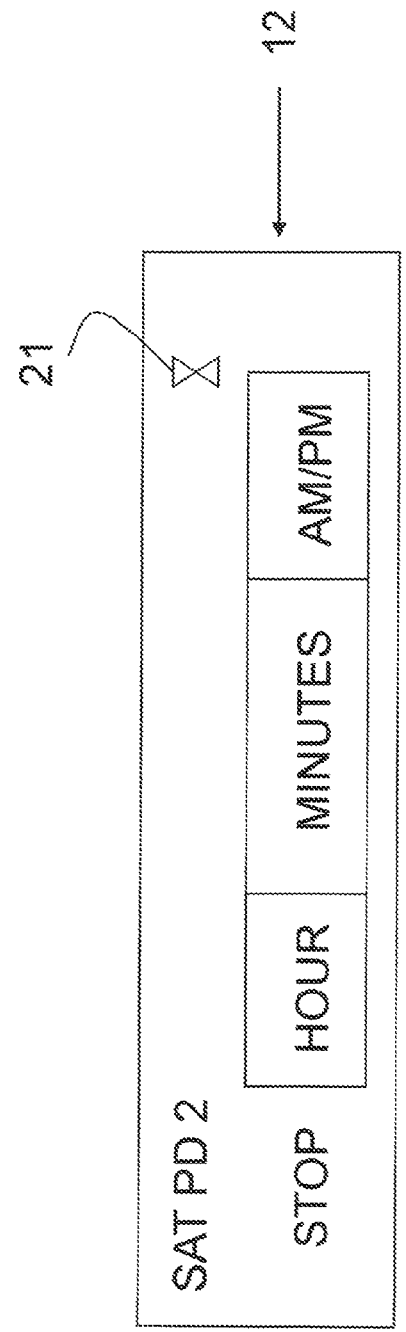

After a final desired day of programming has been selected and set with Start/Stop times by the user, then after PD 1 for the next sequential day (the first non-desired day of operation) is displayed on display 12 the user simply depresses the Enter button 22 twice while the cursor is on the day field displayed (the first non-desired day of operation), which activates operation of the timer device 10 and causes a timer active icon 21 to appear on display 12, as illustrated in FIG. 6B. The display of the timer active icon 21 indicates that the timer device 10 has been activated. To deactivate the timer device 10, while the cursor is on the day field displayed, the Enter button 22 is depressed twice and the tinier active icon 21 disappears from the display 12 to indicate that the timer device 10 is not active. If the timer active icon 21 is deactivated during an active PD 1 or PD 2, power to AC power output connector 25 (FIG. 3) is immediately terminated. If the timer active icon 21 is reactivated during a PD 1 or PD 2 time period, power to AC power output connector 25 (FIG. 3) is again restored. All data associated with depressing any function button 14, 16, 18 20 or 22, and all data associated with all display fields of display 22 discussed above, is stored in the memory 32 (FIG. 3).

If, after the user has completed selecting and setting all desired Start/Stop times for each desired day of operation of timer device 10 for PD 1 (and optionally for PD 2) and the user chooses to instead let the timer device 10 automatically select Start/Stop times of operation for all days previously programmed by the user for PD 1 (and optionally for PD 2), from among the PD1 and PD2 Start/Stop times input by the user, then the user depresses the Mode button 16 three (3) times to select "Random Daily Mode" (RDM) of operation of the timer device 10. The RDM of operation will only be available if at least two (2) days of operation (PD1 and optionally PD2) have been selected and set by the user. The display 12 will display a screen of data fields similar to that illustrated in FIG. 7A, which includes the "RDM" icon, or a similar icon, to indicate that the Random Daily Mode of operation of the timer device 10 has been activated. In other embodiments, the timer active icon 21 may be displayed on display 12, also.

Figure 7A:
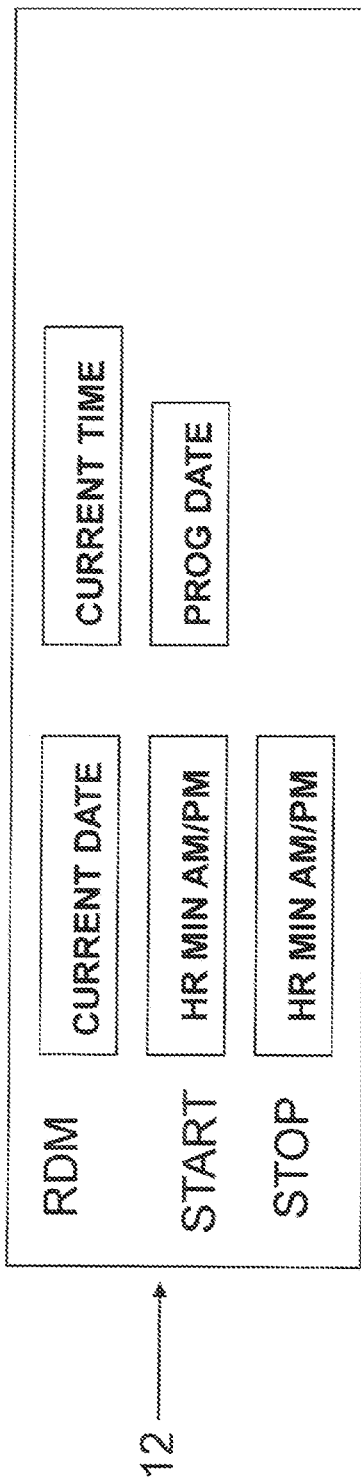

Referring to FIG. 7A, in this embodiment while in RDM display 12 displays Current Date and Current Time information (this information may also be displayed in the Daily Mode FIGS. 4A-6B, as well). The controller 36 (FIG. 3) will randomly select a Start time for PD 1 for the first set day of operation from among any of the PD 1 Start times which have previously been set by the user and stored in memory 32 in the Daily Mode. Likewise, if the first programmed day of operation requires a PD 2 Start time, that also will be selected by the controller 36 from among any of the PD 2 Start times which have previously been set by the user and stored in memory 32. Additionally, a PD 1 Stop time will similarly be selected, which time may or may not have been originally associated with the PD 1 Start time retrieved from memory 32 by the controller 36. Similarly, if the first programmed day of operation requires a PD 2 Stop time, a time for it also will selected by the controller 36 from among any of the PD 2 Stop times which have previously been set by the user and stored in memory 32.

After the PD 1 Start/Stop times (and PD 2 Start/Stop times, if selected) for the first day of operation of timer device 10 have been retrieved by the controller 36 from the memory 32, these times may be displayed in the respective information fields as illustrated in FIG. 7A. If no PD 2 Start/Stop times are to be used for the first day of operation, then those associated fields may be blank. The "Prog Date" information field displays the day of the first day of operation of the timer device 10. While in RDM, as time progresses, after the Prog Date is reached and the Start/Stop times for that day have been cycled through by the timer device 10, the display 12 then displays the next sequential day of operation (if any) as the new Prog Date and also displays new associated PD 1 Start/Stop times (and PD 2 Start/Stop times, if any) which have been assigned by the controller 36 in a manner like than previously described above for the first day of operation. Once all Start/Stop time periods for all programmed days of operation for the timer device 10 have been cycled through, the timer device 10 ceases timer operation, deactivates (removes) the timer active icon 21 from display 12, and displays only the Current Date and Current Time information on display 12.

Figure 7B:
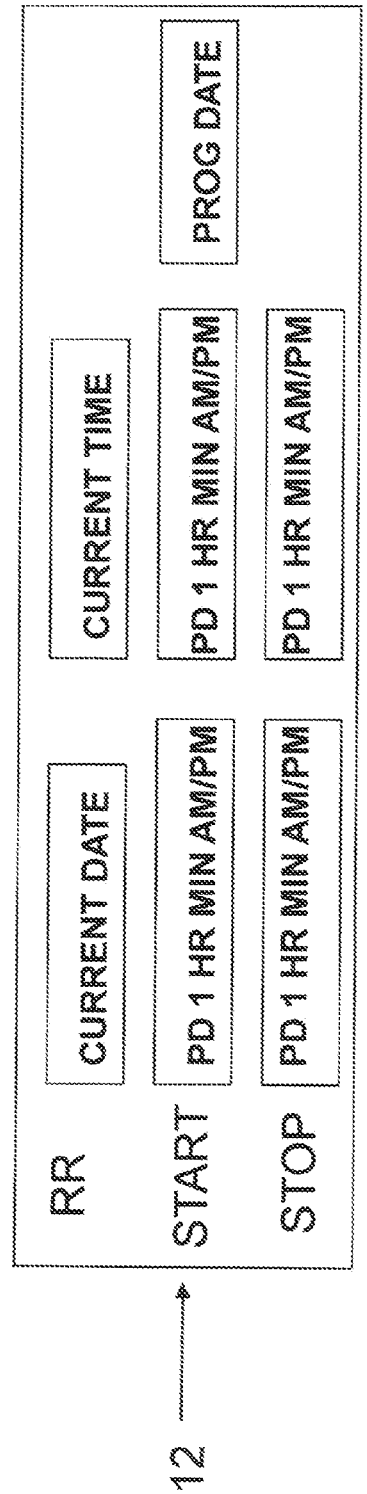

As described above, a user may choose a Random Range (RR) Mode of operation by depressing the Mode button 16 twice after the Set Time/Date information has been selected and set by the user. No entry of specific PD 1 Start/Stop times for each day is required, as was required in the Daily Mode described above. As depicted in FIG. 7B, in RR Mode display 12 displays an "RR" icon and the Current Time and Current Date information, as well as Start and Stop range fields of information. Instead of having to select a specific Start and Stop time for each PD 1 (and a PD 2, if desired) for each day of operation, RR Mode allows the controller 36 to select all such Start/Stop times automatically without further user input. Additionally, the RR Mode allows non-sequential days to be selected for days of operation of the timer device 10 (which is not available in this described embodiment of the RDM or Daily Mode).

In RR Mode, the cursor will first appear in the Prog Date field, which will initially be the same date as that displayed in the Current Date field. If that is the desired first date of operation of the timer 10, the user depresses the Enter button 22 (FIG. 1) once. The cursor then moves to the Start time field for PD 1. If another start date is desired, while the cursor is on the Prog Date field, the user depresses the Up Arrow button 18 to advance the date displayed in the Prog Date field by one day for each press of the Up Arrow button 18, for up to a maximum of 10 days in advance from the Current Date. In other embodiments, more or less days in advance may be chosen.

After the desired Prog Date is selected and the Enter button 22 is depressed once to set that date and provide that information to the memory 32, the cursor moves to the first PD 1 Start range time information field. The user then selects the Hour, Minutes and AM/PM range times for a first start range parameter in a manner similar to the selection of these times as described above for the Daily Mode of operation. The cursor then moves to the second PD 1 Start range time information field, whereby in a similar manner the user selects the Hour, Minutes and AM/PM range times for a second start range parameter. The second Start range parameter time entered must be later in time than the first Start range parameter time. After both the first and second PD 1 Start range time parameters have been selected, then the controller 36 has sufficient information to select a random PD 1 Start time which will be a time value within, or including, the first and second Start range parameters entered by the user.

In a similar manner, after the cursor transitions to the first PD 1 Stop range field and a first Stop range parameter time is selected by the user, the cursor then transitions to the second PD 1 Stop range field and a second Stop range parameter time is selected by the user. Likewise, after both the first and second PD 1 Stop range parameters have been selected, then the controller 36 has sufficient information to select a random PD 1 Stop time which will be a time value within, or including, the first and second Stop range parameters entered. The display 12 will then display PD 2 random range Start/Stop fields. The cursor will be in the first PD 2 range field, which is initially blank.

If the user does not desire to set a random PD 2 Start/Stop time for that date, then the Enter button 22 is depressed on the blank first PD 2 range field. The display 12 will then transition to a screen showing the last selected date of operation in the Prog Date field and the associated PD 1 Start/Stop range parameters (times) for that date. The cursor will be in the Prog Date field.

If instead, the user desires to program another day of operation, the user presses the Up Arrow button 18 until a desired later date is displayed. The user then presses the Enter button 22 once, the selected date is entered into memory 32, and the cursor transitions to the first PD 1 Start range field for that date of operation. Programming then continues as described above.

After all desired Prog Dates (dates of operation) and associated first and second Stop/Start PD1 (and optionally, PD 2) range parameter times have been selected by the user, and while the cursor is in the Prog Date field (after PD 2 Start/Stop range parameters for the most recent Prog Date have been selected or not entered), which shows the last selected date of operation set, the user depresses and holds the Enter button 22 for at least three (3) seconds. This will end the RR programming and initiate operation of timer device 10 in RR Mode. Also, the timer active icon 21 is displayed in display 12, together with the Current Date, Current Time, RR, and PD 1 Start/Stop range information fields, and the Prog Date, as illustrated in FIG. 7B. To deactivate the timer while in RR Mode, the Enter button 22 is depressed and held for at least three (3) seconds while the cursor is in the Prog Date information field. This causes the timer active icon 21 to no longer be present in display 12 and the operation of timer device 10 ceases. Once deactivated, to reactivate the timer device 10 in the RR mode, the RR Mode must be entered again, as described above, by depressing the Mode button 16 twice. Then, all Start/Stop range parameter times must again be selected and input into the timer device 10, since deactivation of the timer device 10 in the RR Mode causes all previously programmed values to be cleared.

As will be appreciated, the processes in preferred embodiments may be implemented using any combination of computer programming software, firmware or hardware.

Although a few embodiments of the present general inventive concept have been illustrated and described, it will be appreciated by those skilled in the art that changes may be made in these embodiments without departing from the principles and spirit of the general inventive concept, and any inventions claimed herein, the scope of which is defined in the appended claims and their equivalents.

What is claimed is:
1. A programmable portable electronic timer, comprising:
 a housing, including a plurality of function buttons disposed on an outer surface of the housing, a display disposed on the outer surface to visually display timer information, a first electrical power connector disposed on the outer surface to receive AC power from a local power grid, and a second electrical power connector disposed on the outer surface to provide AC power to an external electrical device;

wherein the timer further includes internal electronic circuitry, including an AC/DC converter electrically connected to the first electrical power connector and having DC power output connected to the display, a memory electrically connected to the DC power output, and a controller electrically connected to the memory and to the DC power output; and wherein the second electrical power connector is automatically provided AC power by the controller from the local power grid during a selected time period in response to timer control information previously inputted and stored in the memory, such that start and stop times for the selected time period vary over sequential days of operation of the timer, and such that the second electrical power connector is provided AC power by the controller at a start time selected at random by the controller from a range of start time values, the range being bounded by a first start time and a second start time manually input by a user.

2. The timer of claim 1, further including a replaceable battery which provides backup power for operation of the timer while the AC power from the local power grid is unavailable or insufficient to operate the timer.

3. The timer of claim 1, wherein the timer provides AC power to the second electrical power connector over a plurality of sequential days each of which is associated with at least one said time period having a different pre-selected start time and stop time of operation of the timer than any other said timer period.

4. The timer of claim 3, wherein each different selected start time and stop time is selected at random by the timer in response to timer information input by a user.

5. The timer of claim 3, wherein each different selected start time and stop time is selected at random by the timer from a range of pre-selected possible start times and stop times.

6. The timer of claim 1, wherein after the AC power from the local power grid is unavailable, the timer continues to "count down" and when AC power is restored timer operation is not skewed by an amount of time that the AC power was unavailable.

7. A programmable portable electronic timer to provide power from a local power grid to an external electrical device, comprising:
a housing, including a plurality of function buttons, a display to visually display timer information, a first electrical power connector to receive AC power from the local power grid, and a second electrical power connector configured to provide AC power to an external electrical device;
wherein the timer further includes internal electronic circuitry, including an AC/DC converter electrically connected to the first electrical power connector and having DC power output connected to the display, a memory electrically connected to the AC/DC converter DC power output, and a controller electrically connected to the memory and to the DC power output; and
wherein the second electrical power connector is automatically provided AC power from the local power grid during a time period randomly selected by the timer in response to timer control information previously input and stored in the memory, such that the second electrical power connector is provided AC power by the controller at a start time selected at random by the controller from a range of start time values, the range being bounded by a first start time and a second start time manually input by a user.

8. The timer of claim 7, further including a replaceable battery which provides backup power for operation of the timer after the AC power from the local power grid becomes unavailable.

9. The timer of claim 7, wherein the timer provides AC power to the second electrical power connector over a plurality of sequential days each of which is associated with at least one said timer period which has a different pre-selected start time and stop time of operation of the timer than any other said timer period.

10. The timer of claim 7, wherein a start time and a stop time for the time period is selected at random by the timer from a range of pre-selected possible start times and stop times.

11. The timer of claim 10, wherein after the AC power from the local power grid is unavailable, the timer continues to "count down" and operation is not skewed by an amount of time of the AC power unavailability.

12. A method of controlling a programmable portable electronic timer to selectively provide AC power to an external electrical device, including:
selecting a plurality of unique start times and stop times for operation of the electronic timer for each of at least two days of timer operation, where each start time has an associated unique stop time which defines a period of timer operation;
providing AC power to an electrical power connector disposed on the timer only during each defined period of timer operation, such that each defined period of timer operation includes a start time selected at random by the timer from a plurality of start time values including at least a first start time and a second start time manually input by a user, where the electrical power connector is capable of being connected to an external electrical device; and
providing an uninterrupted "count down" of timer information stored within the timer while AC power is unavailable to the timer, such that when AC power is restored to the timer, timer operation of providing AC power to the electrical power connector commences and terminates, respectively, at the pre-selected start times and stop times without being skewed by a period of time that the AC power is unavailable to the timer.

13. The method of claim 12, wherein the start times and stop times are selected at random by the timer in response to timer information stored in the timer.

14. The method of claim 13, wherein the start times and stop times are selected from a range of possible start times and stop times in response to pre-selected range parameter times stored in the timer.

15. The method of claim 12, wherein the selecting of the plurality of unique start times and stop times is accomplished by a user manually inputting start times and stop times into the timer.

16. The method of claim 12, wherein the selecting of the plurality of unique start times and stop times is accomplished automatically by a controller disposed within the timer.

17. The method of claim 14, wherein values presenting the range of possible start times and stop times are pre-selected by a user and stored in the timer.

18. The method of claim 12, wherein the providing of the uninterrupted "count down" of timer information is accomplished by providing DC power from a replaceable battery disposed within the timer to a memory and a controller connected to the memory and disposed within the timer while the AC power is unavailable for timer operation.

* * * * *